(12) United States Patent
Inose

(10) Patent No.: US 9,940,075 B2
(45) Date of Patent: Apr. 10, 2018

(54) PRINT INSPECTION APPARATUS AND PRINT INSPECTION METHOD

(71) Applicant: CANON KABUSHIKI KAISHA, Tokyo (JP)

(72) Inventor: Tsutomu Inose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/738,653

(22) Filed: Jun. 12, 2015

(65) Prior Publication Data

US 2015/0363138 A1 Dec. 17, 2015

(30) Foreign Application Priority Data

Jun. 17, 2014 (JP) ................. 2014-124304

(51) Int. Cl.
*G06F 3/12* (2006.01)
*G06T 7/00* (2017.01)

(52) U.S. Cl.
CPC ............ *G06F 3/121* (2013.01); *G06F 3/1243* (2013.01); *G06F 3/1256* (2013.01); *G06F 3/1285* (2013.01); *G06T 7/001* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 6,738,153 B1 * | 5/2004 | Aschenbrenner | ...... | G06K 15/00 358/1.14 |
| 2009/0073482 A1 * | 3/2009 | Tsuchiya | ............ | G06F 11/0733 358/1.14 |
| 2011/0134485 A1 * | 6/2011 | Ito | ......................... | G06F 3/1208 358/1.18 |
| 2013/0016154 A1 * | 1/2013 | Imamura | ............ | G01N 21/8903 347/19 |
| 2013/0112744 A1 * | 5/2013 | Landers | ............. | G06Q 30/0241 235/375 |
| 2013/0201521 A1 * | 8/2013 | Tsunekawa | ........ | H04N 1/00442 358/1.15 |
| 2013/0250369 A1 * | 9/2013 | Kitai | .................. | H04N 1/00005 358/405 |

FOREIGN PATENT DOCUMENTS

| | | | |
|---|---|---|---|
| JP | 2009075634 A | | 4/2009 |
| JP | 2012-000876 A | | 1/2012 |
| JP | 2012000876 A | * | 1/2012 |
| JP | 2012108854 A | | 6/2012 |
| JP | 2013-134748 A | | 7/2013 |

\* cited by examiner

*Primary Examiner* — Huo Long Chen

(74) *Attorney, Agent, or Firm* — Canon U.S.A., Inc. IP Division

(57) ABSTRACT

A print inspection apparatus according to the present invention obtains an object for variable printing which is stored in a storage and generates a combined image by combining the obtained object. If the combined image is normally generated, the combined image is set to both of a print image and a collation image. Whereas if the combined image is not normally generated, a different image is set to each of the print image and the collation image. The print inspection apparatus generates a print product by printing the set print image. Then, the print inspection apparatus inspects the print product by comparing image data generated by reading the print product with the set collation image.

7 Claims, 10 Drawing Sheets

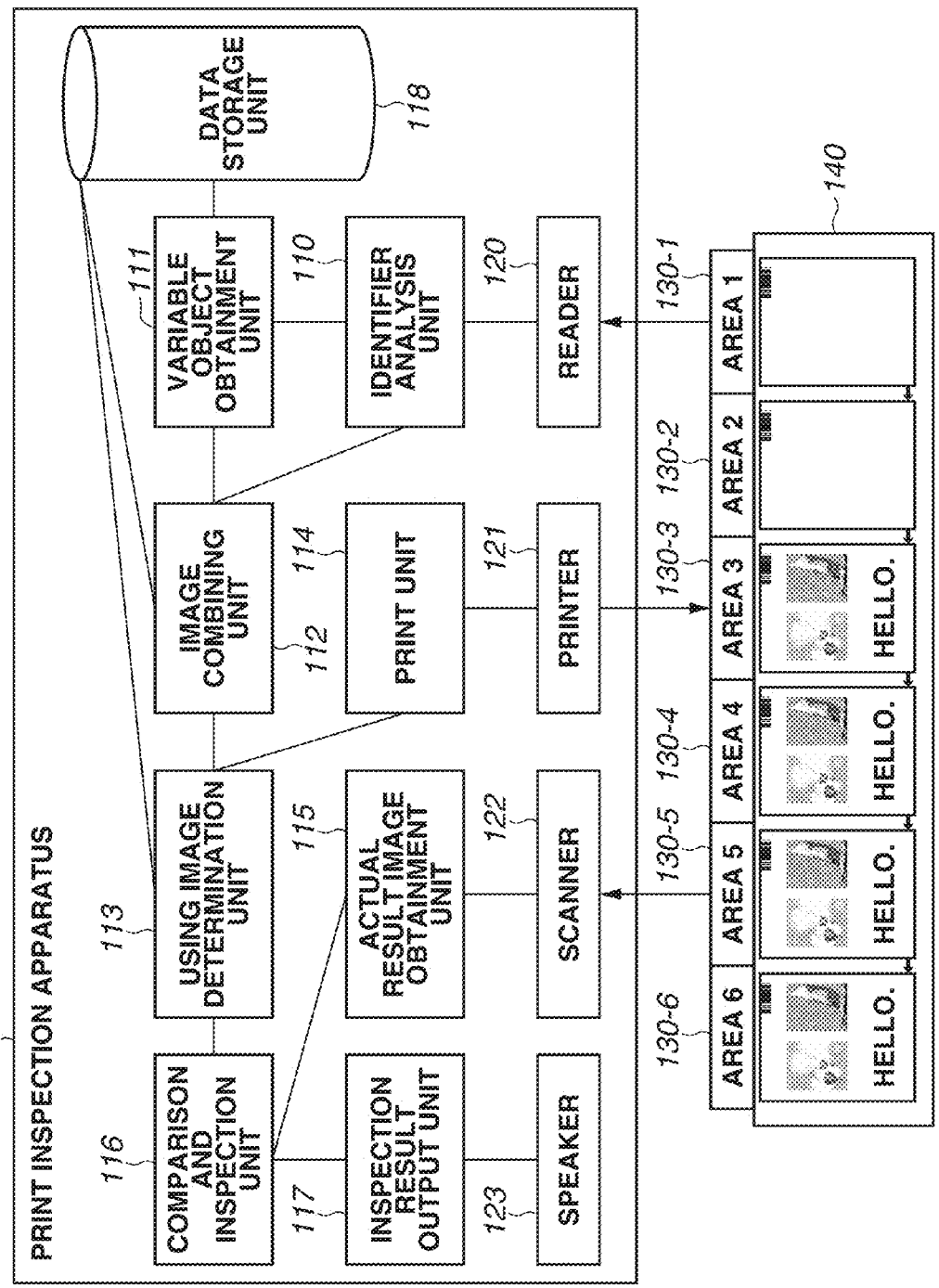

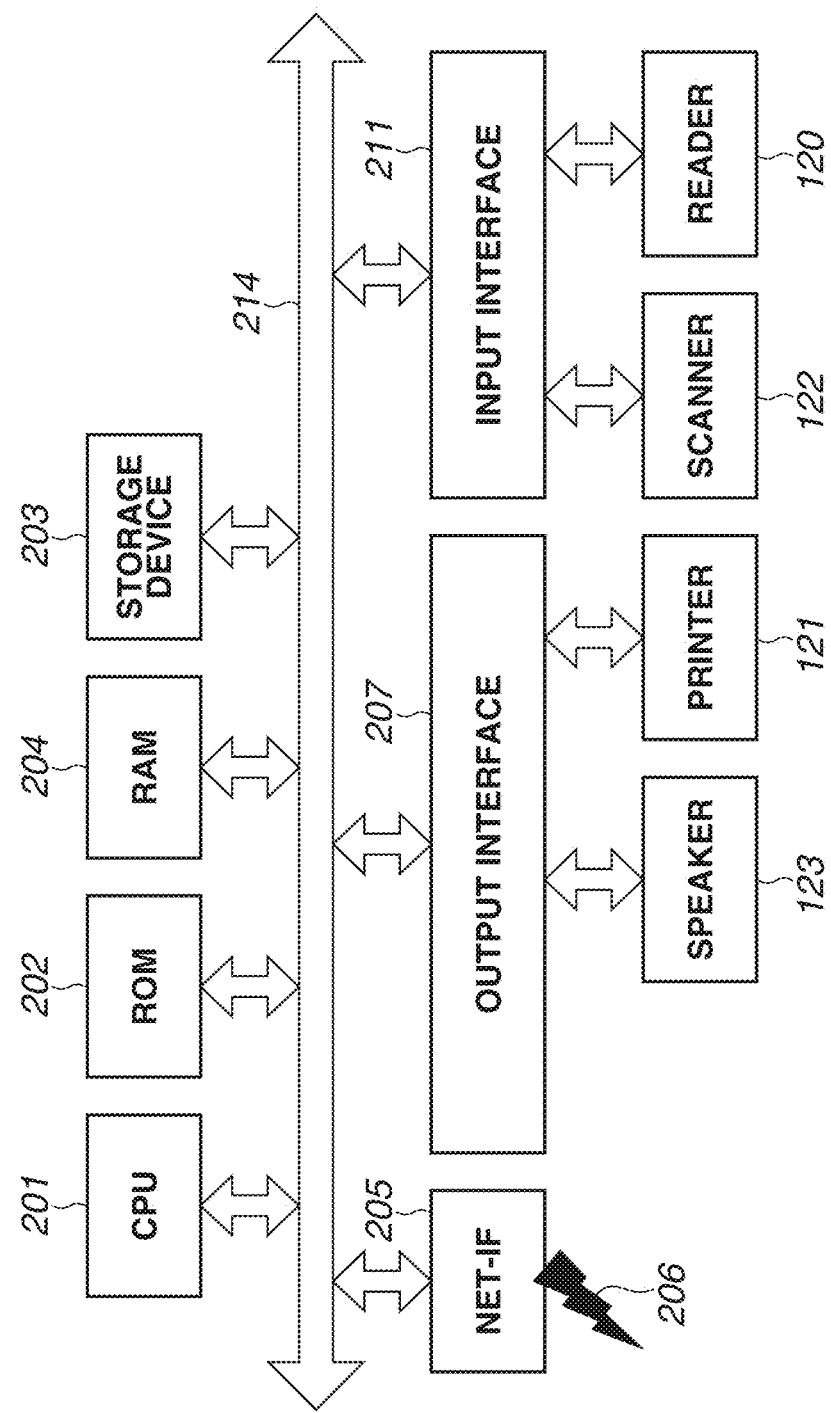

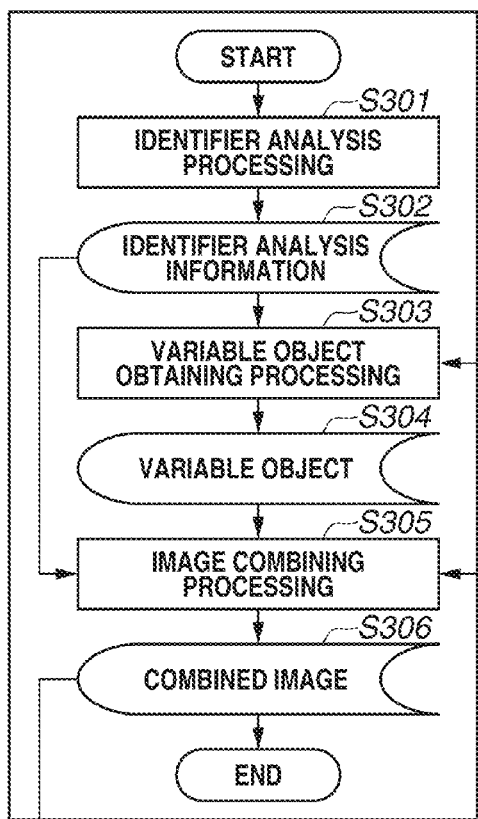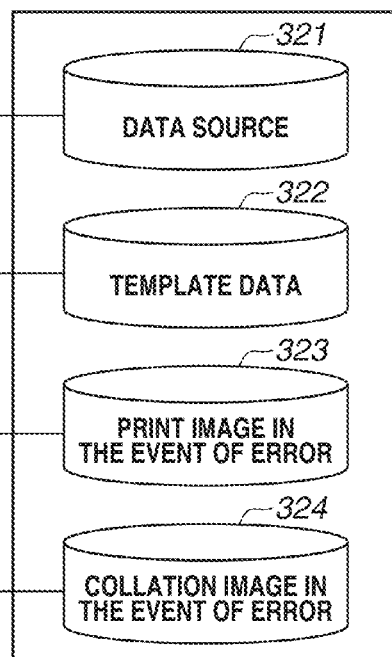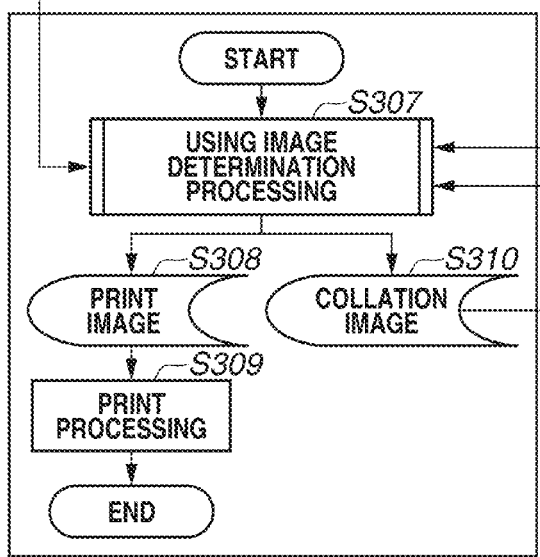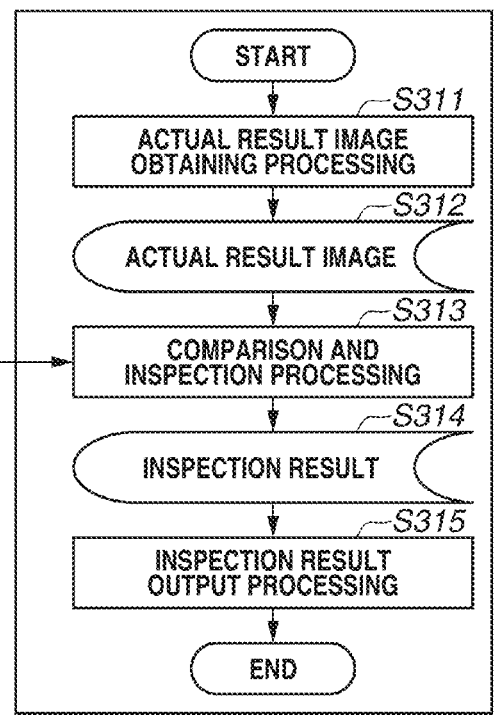

FIG.4A
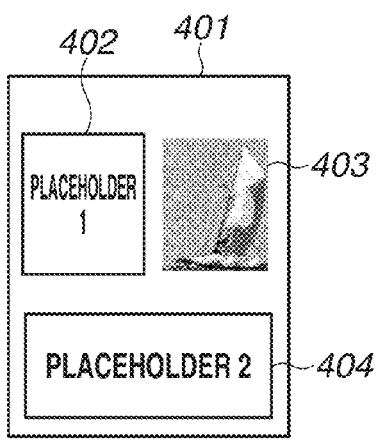
- 401
- 402
- 403 (PLACEHOLDER 1)
- 404 (PLACEHOLDER 2)
FIG.4B
| ID | PH1 | PH2 |
|---|---|---|
| C001 | a.jpeg | HELLO. |
| C002 | b.png | DEAR MADAM OR SIR. |
| C003 | c.tiff | NICE TO MEET YOU. |
411, 412, 413, 414, 415, 416
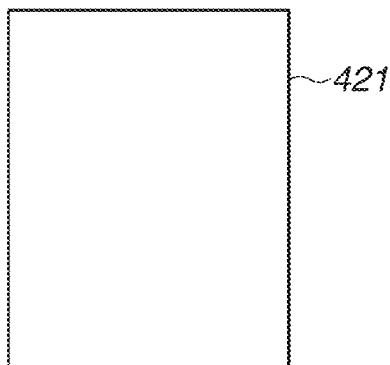
a.jpeg — 418
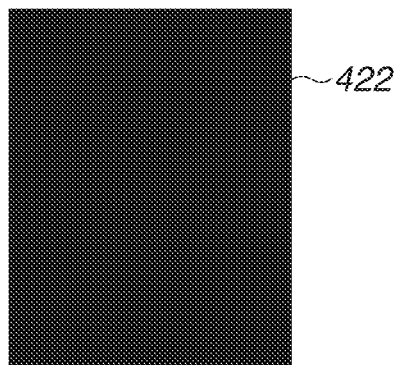
b.png — 419
FIG.4C
421
FIG.4D
422
FIG.4E
```
PLACEHOLDER INFORMATION 1
Box=(20,100,50,80)
ObjectType=IMAGE
Column=PH1
Alignment=TopLeft
```
FIG.4F
```
PLACEHOLDER INFORMATION 2
Box=(20,20,200,80)
ObjectType=TEXT
Column=PH2
Font=GOTHIC
FontSize=72
```

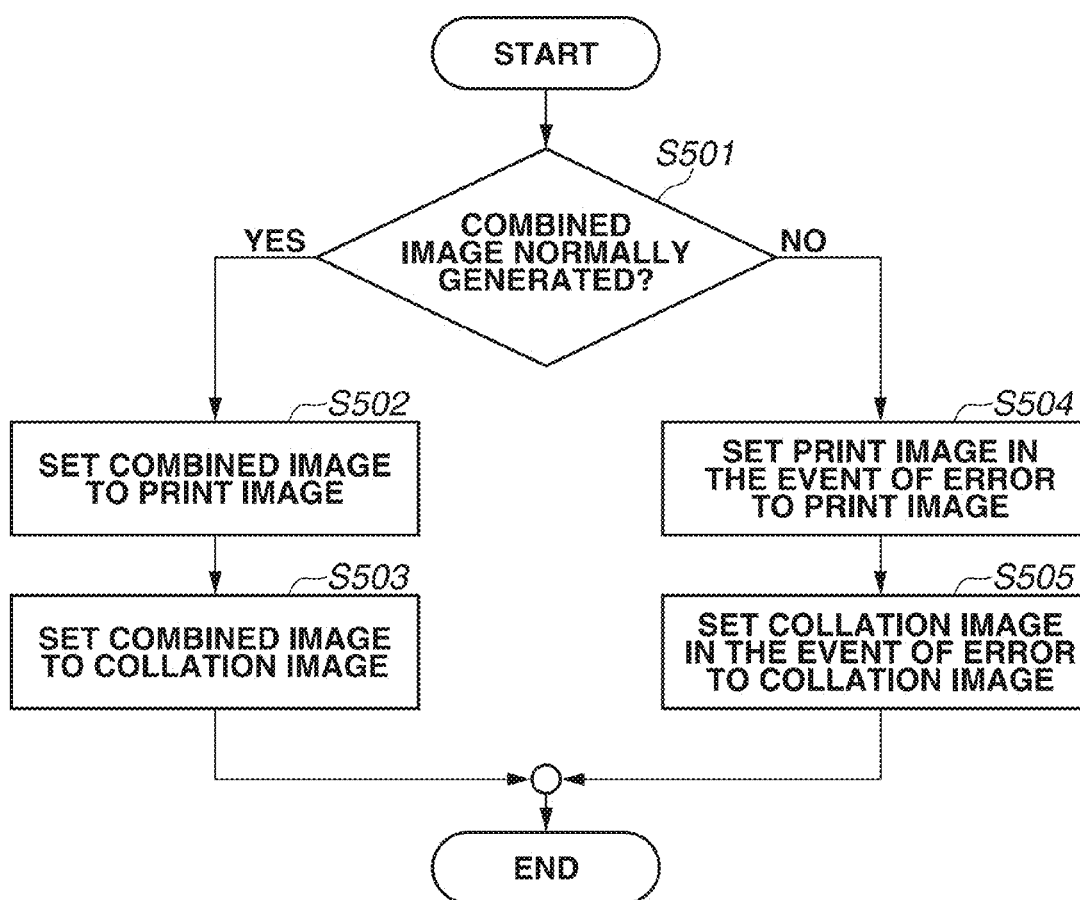

601

602
C 0 0 1

611

613
612
614 — HELLO.

621

| ID |
|---|
| C0001 |

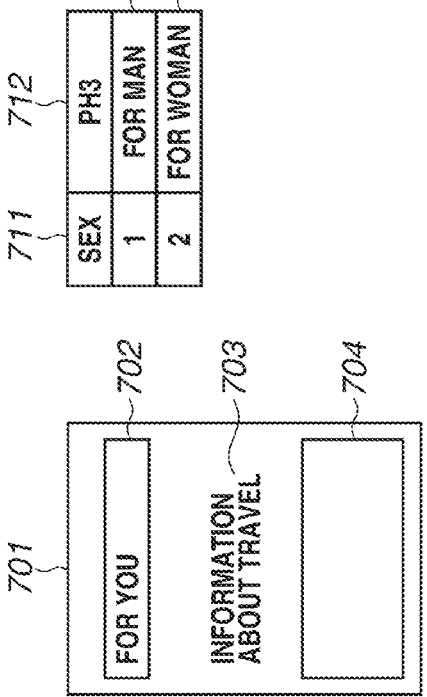

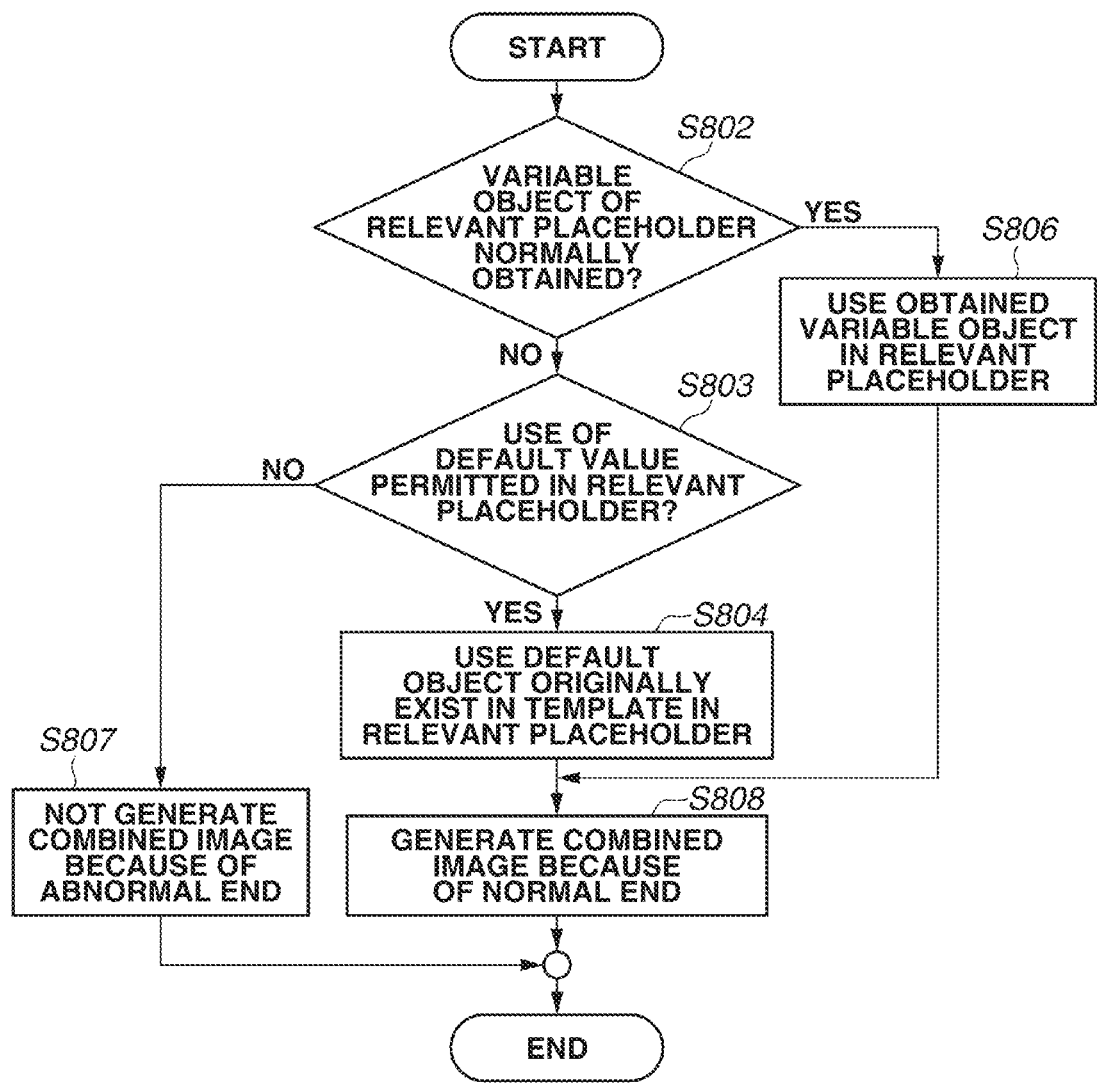

FIG.9A

| ID | SEX | ANNUAL INCOME RANK |
|---|---|---|
| E001 | 0 | — |
| E002 | — | 0 |
| E003 | 1 | A |

| TARGET PH | USE OF DEFAULT VALUE BY SPECIFICATION | USE OF DEFAULT VALUE IN THE EVENT OF ERROR |
|---|---|---|
| PH5 | PERMIT | NOT PERMIT |
| PH6 | NOT PERMIT | PERMIT |

FOR YOU — 922
INFORMATION ABOUT TRAVEL — 923
TRAVEL IN SEASON NOW — 924

FOR YOU — 932
INFORMATION ABOUT TRAVEL — 933
TRAVEL IN SEASON NOW — 934

| SEX | PH5 |
|---|---|
| 1 | FOR MAN |
| 2 | FOR WOMAN |

| ANNUAL INCOME RANK | PH6 |
|---|---|
| A | LUXURIOUS TRAVEL |
| B | REASONABLY PRICED TRAVEL |
| C | INEXPENSIVE TRAVEL |

PLACEHOLDER INFORMATION 5
Box=(20,20,80,200)
ObjectType=TEXT
Column=PH5
Font=GOTHIC
FontSize=72

FIG.9H

PLACEHOLDER INFORMATION 6
Box=(20,200,80,800)
ObjectType=TEXT
Column=PH6
Font=MING STYLE
FontSize=48

PRINT INSPECTION APPARATUS AND PRINT INSPECTION METHOD

BACKGROUND OF THE INVENTION

Field of the Invention

The present invention relates to print inspection of variable printing which performs printing while determining a variable object to use immediately before the printing.

Description of the Related Art

Recently, a print on demand (hereinbelow, referred to as POD) market has expanded with increase in speed and improvement of image quality of electrophotographic method and ink-jet method digital printers. Compared to a conventional offset printing, POD can handle a print job with a relatively small lot in a short delivery period and perform variable data printing (hereinbelow, referred to as VDP) making use of characteristics of using electronic data. A VDP document includes an object used in a fixed part (hereinbelow, referred to as a fixed object) and an object used in a variable part (hereinbelow, referred to as a variable object). Printing is performed by changing the variable object for each client, so that the VDP documents of which contents are different from each other can be printed. ISO 16612-2 portable document format/variable data and transactional (PDF/VT) has been issued as the language specification for variable printing.

PDF/VT is a page description language (PDL) based on PDF and has a high affinity for a work flow which handles PDF as print data. Generally, a very large number of records is included in a data source in VDP. In particular, for example, if one record includes 20 pages and there are 1000 records, PDF/VT includes page information of 20000 pages. In other words, it cannot be estimated sweepingly since a data amount of one page information piece depends on complexity (an amount of drawing data) of the page, however, if VDP includes many records, a large number of the page information pieces are also included, and thus an entire data amount would be very large.

Japanese Patent Application Laid-Open No. 2013-134748 discusses a method for separating VDP data into print data and a data source and combining the print data and the data source at the time of printing. In this method, the print data includes page information for one record and configuration information of a variable part which dynamically changes for each record, and the configuration information of the variable part is combined with the data source at the time of printing, so that a data amount is reduced to an amount of one record.

There is a print inspection technique which reads a print image of a print target and a print product by a scanner or the like and compares the read data pieces with each other to determine whether printing is normally performed. Japanese Patent Application Laid-Open No. 2012-000876 discusses a method for using different criteria in comparison of fixed parts and in comparison of variable parts with use of the above-described print inspection technique and a variable printing technique.

However, when an error occurs in image combining processing, an image including an error (abnormal data) is output as an image combining result in some cases. On the other hand, in the case of the variable printing which performs image combining immediately before printing as described in Japanese Patent Application Laid-Open No. 2013-134748, it is premised that image combining is normally performed. Thus, if an error occurs in combining processing of a print image, abnormal data as the error is regarded as the print image as it is, and an image obtained by reading a print product printed based on the print image by the scanner is the same as the print image when being compared with the print image and inspected, so that an inspection error does not occur. In other words, if the inspection processing is performed by the same method as the conventional method, there is a risk that a check on an inspection error does not function.

The present invention is directed to the provision of a print inspection apparatus capable of detecting an error in inspection processing of a print product even in a case where an error occurs when an image is combined in variable printing which performs image combining immediately before printing in consideration of the above-described issue.

SUMMARY OF THE INVENTION

In order to solve the above-described issue, according to the present invention, a print inspection apparatus which inspects a print product of variable printing includes a combining unit configured to obtain an object which is stored in a storage and used in the variable printing and to generate a combined image by combining the obtained object, an image setting unit configured to, in a case where the combined image is normally generated by the combining unit, set the combined image to both of a print image and a collation image, and in a case where the combined image is not normally generated, set a different image to each of the print image and the collation image, a printing unit configured to generate the print product by printing the print image set by the image setting unit, a reading unit configured to generate image data by reading the print product, and a comparison unit configured to compare image data generated by the reading unit with the collation image set by the image setting unit to perform inspection of the print product.

Further features of the present invention will become apparent from the following description of exemplary embodiments with reference to the attached drawings.

BRIEF DESCRIPTION OF THE DRAWINGS

FIG. 1 is a general arrangement diagram illustrating an example of a print inspection apparatus and an example of a sheet to be printed.

FIG. 2 is a block diagram illustrating a schematic configuration of the print inspection apparatus.

FIGS. 3A to 3D are flowcharts illustrating entire processing of print inspection processing.

FIGS. 4A to 4F illustrate specific examples of data used in the print inspection processing.

FIG. 5 is a flowchart illustrating detail processing of using image determination processing.

FIGS. 7A to 7H illustrate examples of data in print inspection processing according to a second exemplary embodiment.

FIG. 8 is a flowchart illustrating image combining processing according to the second exemplary embodiment.

FIGS. 9A to 9H illustrate examples of data in print inspection processing according to a third exemplary embodiment.

DESCRIPTION OF THE EMBODIMENTS

Figure 6A:
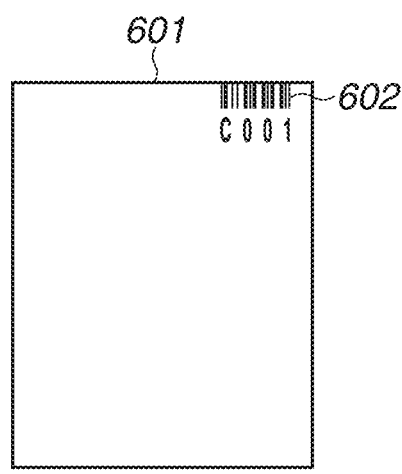
FIGS. 6A to 6C illustrate specific examples of data used in the print inspection processing.

Various exemplary embodiments, features, and aspects of the invention will be described in detail below with reference to the drawings.

FIG. 1 is a general arrangement diagram illustrating a print inspection apparatus according to a first exemplary embodiment and an example of a sheet to be printed by the print inspection apparatus. An outline of a print inspection apparatus 100 is described below with reference to FIG. 1. In FIG. 1, the print inspection apparatus 100 includes a reader 120, a printer 121, a scanner 122, and a speaker 123 as hardware units. The print inspection apparatus 100 also includes an identifier analysis unit 110, a variable object obtainment unit 111, and an image combining unit 112 as software data units. The print inspection apparatus 100 further includes a using image determination unit (i.e., an image setting unit) 113, a printing unit 114, an actual result image obtainment unit 115, a comparison and inspection unit 116, an inspection result output unit 117, and a data storage unit 118. The print inspection apparatus 100 targets on a sheet 140 which is a cut sheet or a continuous print sheet, such as roll paper, on a line, performs reading an identifier on the sheet 140, printing, scanning of a print product, and inspection, and outputs an inspection result.

In FIG. 1, an area 1 (130-1) to an area 6 (130-6) are illustrated to indicate positions on which the sheet 140 is placed for the purpose of illustration. The sheet 140 moves from the area 1 (130-1) to the area 2 (130-2), moves from the area 2 (130-2) to the area 3 (130-3), and reaches the area 6 (130-6). The description is made below targeting at the sheet 140, however, when the sheet 140 is placed on the area 6 (130-6), different sheets may be placed on the area 1 (130-1) to the area 5 (130-5).

The reader 120 reads an identifier for identifying the sheet 140 when the sheet 140 is placed on a reading area of the reader (a position of the area 1 (130-1)). According to the present exemplary embodiment, an identifier is described as a bar code printed in advance on an upper right of the sheet 140, however, another identifier may be used. The printer 121 performs printing when the sheet 140 is placed on an output area of the printer (a position of the area 3 (130-3)). The scanner 122 scan the sheet when the sheet 140 is placed on a reading area of the scanner (a position of the area 5 (130-5)). The speaker 123 emits a sound for informing error occurrence when an inspection result is an error.

The sheet 140 moves from right to left at a speed of, for example, 1 m/s (one meter per second). If a width of each of the area 1 (130-1) to the area 6 (130-6) is 10 centimeters (cm), which is the same as a width of the sheet 140, a time required for the sheet 140 to move one area is 100 milliseconds (ms). In other words, it takes 100 ms for a sheet at the position of the area 1 (130-1) to move to the position of the area 2 (130-2). The sheet 140 placed on the area 1 (130-1) moves to the position of the area 3 (130-3) after a lapse of 200 ms, and moves to the position of the area 5 (130-5) after a lapse of another 200 ms (that is, after a lapse of 400 ms in total). According to the present exemplary embodiment, a moving time is calculated based on a moving speed of the sheet 140, and thus sheets placed on the above-described three positions are synchronized according to an elapsed time after the reader 120 performs the processing. More specifically, the sheet 140 read at the area 1 (130-1) is subjected to printing at the position of the area 3 (130-3) after a lapse of 200 ms and is read at the position of the area 5 (130-5) after a lapse of another 200 ms (that is, after a lapse of 400 ms in total).

The identifier analysis unit 110 analyzes an identifier of a sheet read by the reader 120 and generates identifier analysis information. The identifier analysis information is data of an analysis result of the identifier and, according to the present exemplary embodiment, includes a piece of identification (id) which is described below with reference to FIG. 6C. Further, the identifier analysis information is information which can uniquely identify a variable object. The variable object obtainment unit 111 receives the identifier analysis information and obtains a corresponding variable object from the data storage unit 118 using the identifier analysis information as a key.

The image combining unit 112 obtains a template in the data storage unit 118. The image combining unit 112 combines the obtained template with the variable object obtained by the variable object obtainment unit 111 and generates a combined image. A template includes a fixed part (a fixed object) in which fixed information is always printed and a variable part (a variable object) in which variable information is printed. More specifically, a variable object is arranged in a placeholder which is a variable part on a template and generated as an image.

The using image determination unit 113 determines images to be used as a print image and a collation image by receiving information about whether a combined image is normally generated by the image combining unit 112. The printing unit 114 instructs the printer 121 to perform printing using the print image determined by the using image determination unit 113. The actual result image obtainment unit 115 obtains an image of a result of scanning a sheet placed on the position of the area 5 (130-5) via the scanner 122 as an actual result image. The comparison and inspection unit 116 compares the actual result image obtained by the actual result image obtainment unit 115 with the collation image determined by the using image determination unit 113. If these images are different from each other as a result of the comparison, it is an inspection error. The inspection result output unit 117 receives an inspection result from the comparison and inspection unit 116 and, when an inspection result is an error, causes the speaker 123 to output a sound for informing error occurrence. The data storage unit 118 stores a template for variable printing including a fixed part and a variable part, a data source, a print image used in the event of error occurrence, and a collation image used in the event of error occurrence. The print image used in the event of error occurrence and the collation image used in the event of error occurrence are described below using specific examples.

FIG. 2 is a block diagram illustrating a schematic configuration of the print inspection apparatus according to the present exemplary embodiment. In FIG. 2, a central processing unit (CPU) 201 controls each device connected to a CPU device based on control programs stored in a read-only memory (ROM) 202 and a storage device 203. The ROM 202 stores various types of control programs and data pieces. A random access memory (RAM) 204 includes a work area of the CPU 201, a data save area during error handling, a load area of control programs, and other areas. The storage device 203 stores various types of control programs and data pieces. A network interface (Net-IF) 205 can communicate with other information apparatuses and the like via a network 206.

To the CPU 201, a control program may be provided from the ROM 202 and the storage device 203, or may be provided from other information apparatuses and the like via the network 206. An input interface 211 to devices inputs data to the print inspection apparatus. An output interface 207 outputs data generated and stored in the print inspection apparatus and data supplied via the network 206. The input interface 211 is connected to input devices of the scanner 122 and the reader 120. The output interface 207 is connected to output devices of the speaker 123 and the printer 121. A CPU bus 214 includes an address bus, a data bus, and a control bus. The CPU bus 214 is connected to the input interface 211, the output interface 207, the Net-IF 205, the CPU 201, the ROM 202, the RAM 204, and the storage device 203.

According to the present exemplary embodiment, an information processing program code including contents of the present invention is stored in the storage device 203 and executed by the CPU 201. Data pieces obtained from the reader 120 and the scanner 122 are stored in the RAM 204 via the input interface 211. The CPU 201 recognizes and analyzes contents in the RAM 204 based on the control program. An analyzed result is transmitted to the speaker 123, the printer 121, and the Net-IF 205 via the RAM 204 and the storage device 203 and transmitted to other apparatuses via the network 206 as needed.

FIGS. 3A to 3D illustrate processing flows according to the present exemplary embodiment. The processing flows and specific examples of data pieces of the print inspection apparatus are described below with reference to the drawings. FIG. 3B illustrates details of data pieces stored in the data storage unit 118 in FIG. 1. In FIG. 3B, a data source 321, template data 322, a print image 323 in the event of an error, and a collation image 324 in the event of an error are stored in the data storage unit 118. FIGS. 3A, 3C, and 3D are the processing flows. Processing in each flow in FIGS. 3A, 3C, and 3D can be executed in parallel. A combined image generated by the processing in step S306 in FIG. 3A is used in the processing in FIG. 3C. A collation image generated by the processing in step S310 in FIG. 3C is used in the processing in FIG. 3D. The processing in the flows in FIGS. 3C and 3D are executed after a lapse of a certain period of time (at a regular time interval) from a start of the processing in FIG. 3A. Thus, data (image) generated in the processing in FIGS. 3A and 3C may not be ready in time for a start of the processing in FIGS. 3C and 3D in some cases. A timing of starting the processing and a case when the data is not ready in time for the start are described below. The specific processing flows are described below with reference to other drawings.

FIGS. 4A to 4F are specific examples data pieces (images) used in the processing flow illustrated in FIG. 3. FIG. 4A is a specific example of a template of the template data 322. On a template form 401, a placeholder 1 (402) and a placeholder 2 (404) which are variable parts and an image 403 which is a fixed part are arranged. FIG. 4B is a specific example of the data source 321 in FIG. 3. FIG. 4B includes data pieces of an id 411, PH1 (412), and PH2 (413), and data of images and the like indicated by data values of the id 411, PH1 (412), and PH2 (413). A value of the id 411 is C001 in a row 414. A value of the id 411 is C002 in a row 415. A value of the id 411 is C003 in a row 416. The row 414 includes a value "a.jpeg" in PH1 (412) and a value "Hello" in PH2 (413). The row 415 includes a value "b.png" in PH1 (412) and a value "Dear Madam or Sir." in PH2 (413). The row 416 includes a value "c.tiff" in PH1 (412) and a value "Nice to meet you." in PH2 (413). An image 418 is an image file indicated by "a.jpeg", and an image 419 is an image file indicated by "b.png". According to the present exemplary embodiment, there is no image file indicated by "c.tiff".

FIG. 4C is a print image used in the event of error occurrence. FIG. 4D is a collation image used in the event of error occurrence. FIG. 4C is a blank page (blank page image) 421, and thus nothing is printed when an error occurs which can save inks, toners, and so on. In addition, since nothing is printed, it is easy to find out a print result in which the error occurs among print results. In FIG. 4D, any image different from an image in FIG. 4C may be used, and according to the present exemplary embodiment, a black page (black page image) 422 is used in contrast with the blank page in FIG. 4C. FIG. 4E is placeholder information 1 describing information about the placeholder (402). The placeholder information 1 includes a Box value indicating an arrangement position and a range of the placeholder, IMAGE as an ObjectType value indicating a type of an object to be arranged, and PH1 as a Column value indicating a column in the data source.

FIG. 4F is placeholder information 2 describing information about the placeholder 2 (404). The placeholder information 2 includes a Box value indicating an arrangement position and a range of the placeholder, TEXT as an ObjectType value indicating a type of an object to be arranged, and PH2 as a Column value indicating a column in the data source. The placeholder information may be stored in a template or managed separately from a template.

Figure 6B:
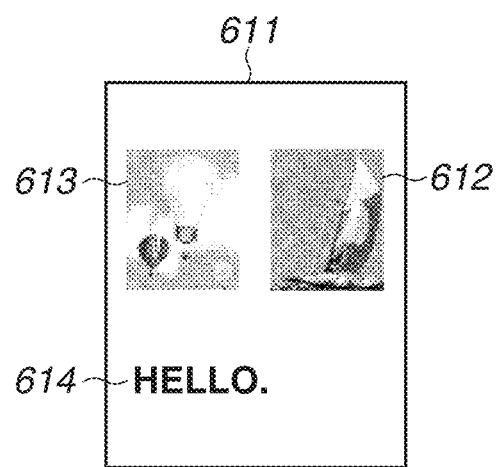
Figure 6C:
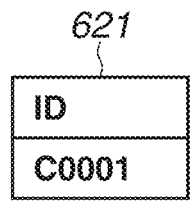

FIGS. 6A to 6C are specific examples of data pieces used in the descriptions of the processing flows illustrated in FIG. 3. FIG. 6A illustrates the sheet 140 when it is placed on the area 1 (130-1) and the area 2 (130-2). A sheet 601 in FIG. 6A is a print target sheet. An identifier 602 is an identifier of the sheet 601 as the print target, and according to the present exemplary embodiment, the identifier 602 is a bar code. A combined image 611 in FIG. 6B is generated by the image combining unit 112. Variable objects 613 and 614 are obtained from the data source in FIG. 4B based on the identifier of the sheet 601. An image 612 is the image 403 arranged on the template as the fixed part in FIG. 4A. FIG. 6C is an example of identifier analysis information. According to the present exemplary embodiment, the identifier analysis information includes a value C001 as the id.

Next, the processing flow illustrated in FIGS. 3A to 3D are specifically described with reference to FIGS. 4A to 4F and FIGS. 6A to 6C. In step S301 in FIG. 3A, identifier analysis processing is started. Next, in step S302, the identifier analysis unit 110 analyzes an identifier of the sheet 140 placed on the position of the area 1 (130-1) at which the sheet 140 is read by the reader 120 and generates identifier analysis information. The identifier analysis processing to be started in step S301 is started when the sheet 140 is placed on the position of the area 1 (130-1). The identifier analysis information generated in step S302 includes values indicated in FIG. 6C. When the identifier analysis information is generated and output in step S302, then in step S303, variable object obtaining processing is executed.

In the variable object obtaining processing in step S303, the variable object obtainment unit 111 reads the identifier analysis information generated in step S302 and obtains a variable object of which id is C001 from the data source 321. As illustrated in FIG. 4B, a row of which value in the id 411 is C001 is the row 414. The row 414 includes the value "a.jpeg" in PH1 (412) and the value "Hello" in PH2 (413). Further, when calculation is performed based on the Columns in the placeholder information pieces in FIGS. 4E and 4F, a value "a.jpeg" of PH1 and a value "Hello" of PH2 are respectively obtained for the placeholder 1 and the placeholder 2. The value "a.jpeg" of PH1 is an image file name, and an object type of PH1 of the placeholder information 1 is IMAGE, therefore the image 418 indicated by the image file name is a variable object to be obtained. An object type of PH2 of the placeholder information 2 is TEXT, and the value "Hello" of PH2 matches with the object type. Therefore, the text will be a variable object to be obtained as it is. In other words, in the variable object obtaining processing in step S303, variable objects are obtained in such a manner that PH1 and PH2 are respectively obtained for the placeholder 1 (402) and for the placeholder 2 (404) from the data source 321. Then, in step S304, the obtained variable objects are output to the RAM 204. When the variable objects are generated in step S304, then in step S305, image combining processing is executed.

Next, in the image combining processing in step S305, the image combining unit 112 obtains a template from the template data 322. In step S306, the image combining unit 112 arranges the variable objects obtained from the RAM 204 in step S304 in placeholders in the template and generates a combined image. More specifically, as the variable objects, there are the image 418 for the placeholder 1 (402) and the text "Hello" for the placeholder 2 (404). Thus, the image 418 is arranged in the placeholder 1 (402), the text "Hello" is arranged in the placeholder 2 (404), and a combined image is generated by combining them with the image 403 which is the fixed part. When a series of the processing illustrated in FIG. 3A is normally completed, the combined image generated in step S306 is output and stored in the storage device 203. In this regard, if the combined image is stored together with information, for example, identification information and a generation time, a determination of whether the combined image exists or not becomes easier in using image determination processing in step S307, which is described below. On the other hand, when the processing in FIG. 3A is not normally completed, the combined image is not output. For example, there are three cases that a combined image is not normally output.

A first case is that the identifier analysis information includes an error. More specifically, the first case is that the identifier is mistakenly read or analyzed in step S301, and accordingly, a wrong id value, for example, id=Z999, is input to the identifier analysis information in step S302. In this case, id data corresponding to id=Z999 does not exist in the data source 321, and a variable object cannot be obtained. Therefore, a variable object having a correct value cannot be obtained in step S303. Thus, no variable object to be a combining target exists in the image combining processing in step S306, and the image combining fails.

A second case is that the data source 321 does not include a correct value. More specifically, the second case is that reading and analysis in step S301 are normally performed, and a value of the id is C003 in the identifier analysis information in step S302. The row 416 of which value of the id 411 is C003 includes a value "c.tiff" in PH1 and a value "Nice to meet you." in PH2. If a variable object having C003 in the id is tried to be obtained, an image corresponding to "c.tiff" is not included in FIG. 4B. That is, an image for the placeholder 1 does not exist. Thus, an image does not exist, and a variable object having a correct value cannot be output in step S303. In this case, no variable object to be a combining target exists in the image combining processing in step S306, and the image combining fails.

A third case is that generation of a combined image is not ready in time for the processing. More specifically, the third case is that reading and analysis in step S301 are normally performed, and a value of the id is C002 in the identifier analysis information in step S302. In this case, when a variable object of which id is C002 is tried to be obtained from the data source 321, the row 415 of which value of the id 411 is C002 includes the value "b.png" in PH1 and a value "Dear Madam or Sir." in PH2. An image corresponding to "b.png" is included in FIG. 4B. However, the obtaining processing in step S303 may take a very long time in some cases for a reason that a size of the image is huge and the like. In such a case, it may take a long time to output a variable object in step S304. Therefore, a start time of the image combining processing in step S305 may be delayed. As described below, the using image determination processing in step S307 is started not by waiting the generation of a combined image in step S306 but by time. Therefore, if the start time of the image combining processing in step S305 is delayed, the using image determination processing in step S307 may be executed before completion of the generation of the combined image in step S306. Such a situation is the case that the generation of the combined image is not ready in time for the processing.

The print inspection apparatus according to the present exemplary embodiment executes the processing according to time. Therefore, print processing in step S309, which is described below, needs to be completed after 200 ms from reading of the sheet by the reader 120. Thus, the using image determination processing in step S307 is started before the elapse of 200 ms in consideration of a time required for the print processing. However, there can be a case that the combined image in step S306 does not exist at the start time as described above. In this case, in the using image determination processing in step S307, the using image determination unit 113 starts the processing by time. When the processing is started, there are two cases, one is that the combined image in step S306 exists in the storage device 203 (the combined image is normally processed) and the other is that the combined image does not exists therein (the combined image is not normally processed). Therefore, processing in a flowchart specifically illustrated in FIG. 5 is executed to set a print image and a collation image corresponding to a normal case and an abnormal case in the using image determination processing in step S307. The processing is described below with reference to FIG. 5.

FIG. 5 is a flowchart illustrating details of the using image determination processing in step S307. First, in step S501, the using image determination unit 113 determines whether the combined image is normally generated. As described above, it is determined as normal when the combined image exists in step S306, and it is determined as abnormal when the combined image does not exist in step S306. In step S501, when the using image determination unit 113 determines as normal (the combined image exists) (YES in step S501), the processing proceeds to step S502. Then, in step S502, the using image determination unit 113 sets the combined image to a print image in step S308. Next, in step S503, the using image determination unit 113 sets the combined image to a collation image in step S310. In other words, the combined image is set to both of the print image and the collation image.

Whereas, in step S501, when the using image determination unit 113 determines as abnormal (the combined image does not exist) (NO in step S501), the processing proceeds to step S504. In step S504, the using image determination unit 113 obtains a print image in the event of an error from the print image 323 in the event of an error in FIG. 3B and sets the obtained image to the print image in step S308. Next, in step S505, the using image determination unit 113 obtains a collation image in the event of an error from the collation image 324 in the event of an error in FIG. 3B and sets the obtained image to the collation image in step S310. A specific example of the print image 323 in the event of an error is shown in FIG. 4C. A specific example of the collation image 324 in the event of an error is shown in FIG. 4D. According to the present exemplary embodiment, the image in FIG. 4C and the image in FIG. 4D are different from each other.

The print image set in step S308 and the collation image set in step S310 are stored in the RAM 204. When the processing in step S503 or in step S505 is completed, the using image determination processing in step S307 is completed. Then, the processing is returned to the processing flow in FIG. 3C, and the print image is output in step S308, and the collation image is output in step S310. Next, in step S309, the printing unit 114 performs the print processing using the output print image.

Next, in actual result image obtaining processing in step S311, the actual result image obtainment unit 115 scans an actual printed image, and in step S312, outputs the scanned result as an actual result image (image data). The actual result image obtaining processing in step S311 is executed 400 ms later from the reading of the sheet 140 by the reader 120, in other words, when the sheet 140 is placed on the area 5 (130-5). Next, in comparison and inspection processing in step S313, the comparison and inspection unit 116 compares the collation image output in step S310 with the actual result image output in step S312. As a result of comparison, in step S314, the comparison and inspection unit 116 outputs an inspection result as normal in the case that the images match with each other or as abnormal in the case that the images do not match with each other. Next, in inspection result output processing in step S315, if the inspection result output in step S314 is the abnormal, the inspection result output unit 117 causes the speaker 123 to output a sound emitted when an error occurs to inform occurrence of an inspection error.

As described above, according to the present exemplary embodiment, when an error occurs in the image combining processing, a different image is used for each of a print image and a collation image in the event of error occurrence, and thus an error occurred in the image combining processing can be easily detected. Therefore, the present exemplary embodiment can avoid printing a wrong combined image when an error occurs in the image combining processing. Further, when an error occurs in the image combining processing, the print image and the collation image are different from each other, an inspection error can be detected in the inspection. Furthermore, when an error occurs in the image combining processing, no image is printed in the print processing, and thus an error sheet can be easily found from among other printed sheets. In addition, after removing a cause of the error, the processing can be executed on the sheet from the beginning, so that the error can be recovered without wasting the sheet.

As described above, it is not necessary to stop the print processing as-needed basis when an error occurs in the image combining processing, the print processing may be stopped when an error occurs, if needed. According to the present exemplary embodiment, a bar code is used as an identifier of the sheet 140, however, the identifier is not limited to the bar code and may be any identifiable one, for example, a two-dimensional cord and a radio frequency identification (RFID). In addition, the inspection result output unit 117 outputs a sound through the speaker 123, however, the processing is not limited to this. For example, a result of an inspection error may be transmitted as an e-mail describing an occurrence time and occurrence identifier analysis information to a mail address of a worker in charge, or these information pieces may be displayed on a monitor.

According to the present exemplary embodiment, when an error occurs in the image combining processing in step S305, a combined image is not generated, however, the processing is not limited to this. For example, error information is generated separately from a combined image, and identifier analysis information about the error, a placeholder name of an error target, and a cause of the error may be described in the error information. Further, if the error information is included in an inspection result together with the collation image in the comparison and inspection processing, the error information pieces can be displayed and transmitted in the inspection result output processing in step S315. According to the present exemplary embodiment, a print target is a sheet, however, the print target is not limited to the sheet and may be anything that the printer can print thereon, for example, a plastic card and a figure.

According to the present exemplary embodiment, the reader 120 and the scanner 122 individually perform reading, however, the configuration is not limited to this, and other image capturing apparatuses, such as a still camera and a video camera, may be used. The processing illustrated in FIGS. 3C and 3D is executed after a lapse of a predetermined period of time from the start of the processing in FIG. 3A, however, the processing is not limited to this. For example, readers are respectively installed to the printer 121 and the scanner 122, and the processing may be executed at a timing when the reader reads the identifier.

Next, a second exemplary embodiment is described. A configuration and processing flows according to the present exemplary embodiment conform to those of the first exemplary embodiment. According to the first exemplary embodiment, three cases are described as cases in which a combined image is not normally generated. In contrast, according to the present exemplary embodiment, it is described that the first and the second cases in the three cases can generate a combined image in some situations.

Points different from the first exemplary embodiment are described with reference to FIGS. 7A to 7H. FIGS. 7A to 7H are specific examples of data pieces used in the present exemplary embodiment. FIG. 7A is a template according to the present exemplary embodiment. The template illustrated in FIG. 7A includes a template form 701, a placeholder 3 (702), namely PH3, as a variable part, a text 703 as a fixed part, and a placeholder 4 (704), namely PH4, as a variable part. The placeholder 3 (702) includes a text "For you" as default data. The default data is a text, an image, or the like which is used when a variable object cannot be obtained. The default data is not necessarily arranged on the template and may be managed separately. The placeholder 4 (704) includes a text "Information about travel". According to the present exemplary embodiment, not a bar code but an RFID is used for an identifier. Thus, in the present exemplary embodiment, the reader 120 illustrated in FIG. 1 is not a bar code reader but an RFID reader.

FIGS. 7B and 7C are data sources according to the present exemplary embodiment. FIG. 7B includes a sex 711 and "PH3" 712. A row 713 and a row 714 respectively include a value "1" and a value "2" in the sex 711. FIG. 7C includes an annual income rank 721 and "PH4" 722. A row 723, a row 724, and a row 725 respectively include a value "A", a value "B", and a value "C" in the annual income rank 721.

FIG. 7D is identifier analysis information according to the present exemplary embodiment. The identifier analysis information includes an id 731, a sex 732, and an annual income rank 733. A row 734 and a row 735 respectively include a value "C001" and a value "C002" in the id 731. The row 734 and the row 735 respectively include a value "B" and a value "–" in the annual income rank 733. The value "–" is input when reading and analysis of an identifier are not normally performed.

FIG. 7E illustrates a combined image which is generated when the id 731 of the identifier analysis information is "C001" according to the present exemplary embodiment. On a form 741, the text "For you" is written in an area of the placeholder 3 (742), the text "Information about travel" is written in the fixed part 743, and a text "Reasonable priced travel" is written in an area of the placeholder 4 (744). The combined image generation processing in FIG. 7E is described below with reference to a processing flow in FIG. 8. FIG. 7F includes data pieces for managing permission and non-permission of use of a default value by placeholder according to the present exemplary embodiment. FIG. 7F includes a target PH 751 and use of default value 752. A row 753 and a row 754 respectively include a value "PH3" and a value "PH4" in the target PH 751.

FIG. 7G is placeholder information 3 describing information about the placeholder 3 (702). The placeholder information 3 includes a Box value indicating an arrangement position and a range of the placeholder, TEXT as an ObjectType value indicating a type of an object to be arranged, and PH3 as a Column value indicating a column in the data source. FIG. 7H is placeholder information 4 describing information about the placeholder 4 (704). The placeholder information 4 includes a Box value indicating an arrangement position and a range of the placeholder, TEXT as an ObjectType value indicating a type of an object to be arranged, and PH4 as a Column value indicating a column in the data source.

Next, the image combining processing illustrated in FIG. 8 according to the present exemplary embodiment is described. First, in step S802, it is determined whether a variable object of the relevant placeholder is normally obtained. If the variable object is normally obtained (YES in step S802), the processing proceeds to step S806, whereas if the variable object is not normally obtained (NO in step S802), the processing proceeds to step S803. Next, in step S803, it is determined whether use of a default value is permitted (i.e., the default value is usable) to the relevant placeholder. If it is permitted (YES in step S803), the processing proceeds to S804, whereas if it is not permitted (NO in step S803), the processing proceeds to S807. Then, in step S804, the default object is used in the relevant placeholder.

In step S806, since the variable object is normally obtained, the obtained variable object is used in the relevant placeholder. In step S807, since use of the default value is not permitted, the processing is abnormally ended, and a combined image is not generated. The processing in step S804 or in step S806 is normally ended, and in step S808, a combined image is generated. Accordingly, the processing is completed.

Next, points different from the image combining processing in FIG. 3 according to the first exemplary embodiment are described with reference to FIG. 8. First, processing contents are specifically described using the row 734 in FIG. 7D as an example. According to the present exemplary embodiment, the processing is performed on the placeholder 3 (702) and the placeholder 4 (704) in FIG. 7A.

First, processing when the relevant placeholder is the placeholder 3 (702) is described. In step S802, the image combining unit 112 determines whether the variable object obtainment unit 111 can normally obtain a variable object. In this case, the relevant placeholder is the placeholder 3 (702), and a value in the column of "PH3" (712) in FIG. 7B is a value to be obtained based on the placeholder information 3 in FIG. 7G. In order to obtain a value in the column of "PH3" (712) in FIG. 7B, the image combining unit 112 searches the sex 711 in FIG. 7B to obtain the variable object using the sex 732 in the row 734 in FIG. 7D, which is the identifier analysis information, as a key.

Since the value of the sex 732 in the row 734 in FIG. 7D is "–", if the image combining unit 112 tries to obtain a variable object from the data source in FIG. 7B, data having a value "–" is not included in the sex 711 in FIG. 7B, and the processing becomes an error. In this case, it is determined that a variable object is not normally obtained, and it will be "NO" in step S802. Thus, the processing proceeds to step S803.

Next, in step S803, the image combining unit 112 determines whether the use of the default value is permitted to the relevant placeholder. In step S803, the image combining unit 112 reads data for managing permission of use of the default value by placeholder in FIG. 7F and obtains information about whether the use of the default value is permitted to the placeholder 3 (702). In the row 753 in FIG. 7F, the target PH 751 includes a value "PH3" and the use of default value 752 includes a value "permit". Therefore, a determination result in step S803 will be "YES", and the processing proceeds to step S804. Next, in step S804, the default data is used in the placeholder 3 (702), and thus the text "For you" on the template is used.

Next, the processing is described which is executed when the relevant placeholder is the placeholder 4 (704). In step S802, the image combining unit 112 determines whether a variable object of the relevant placeholder is normally obtained. In step S802, the image combining unit 112 reads the annual income rank 733 in the row 734 in FIG. 7D which is the identifier analysis information and obtains the variable object. A specific obtaining method of a variable object is as follows. In this case, the relevant placeholder is the placeholder 4 (704), and it can be understood that a value in the column of "PH4" 722 in FIG. 7C is a value to be obtained based on the placeholder information 4 in FIG. 7H. In order to obtain a value in the column of "PH4" 722 in FIG. 7C, the image combining unit 112 searches the annual income rank 721 in FIG. 7C to obtain the variable object using the annual income rank 733 in the row 734 in FIG. 7D, which is the identifier analysis information, as a key. A value of the annual income rank 733 in the row 734 in FIG. 7D is "B" which matches with "Reasonable priced travel" in FIG. 7C, and thus "Reasonable priced travel" is obtained as the variable object. In step S802, it is determined that the variable object is normally obtained (YES in step S802), and the processing proceeds to step S806.

Next, in step S806, the image combining unit 112 determines to use the text "Reasonable priced travel" in FIG. 7C obtained in step S802. Then, in step S808, the image combining unit 112 generates a combined image in FIG. 7E using the determined variable objects in the corresponding placeholders. As described above, in the case that the use of the default value is permitted, if an error occurs in the placeholder in which the default value may be used, an image can be normally generated, printed, and inspected without regarding it as an error.

Next, since the processing regarding the row 735 in FIG. 7D is different from that of the row 734, the processing regarding the row 735 is described. First, the processing is described which is executed when the relevant placeholder is the placeholder 3 (702).

In step S802, the image combining unit 112 determines whether a variable object of the relevant placeholder is normally obtained. The row 735 in FIG. 7D includes a value "2" in the sex 732. When a text corresponding to the value "2" of the sex is obtained from the data source in FIG. 7B, a text "For woman" is normally obtained as the variable object. Therefore, a determination result in step S802 will be "YES", and the processing proceeds to step S806. Next, in step S806, the text "For woman" is used in the relevant placeholder.

Next, the processing is described which is executed when the relevant placeholder is the placeholder 4 (704). The value of the annual income rank 733 in the row 735 in FIG. 7D is "–", and the variable object cannot be obtained. Therefore, a determination result in step S802 will be "NO", and the processing proceeds to step S803. Next, in step S803, the image combining unit 112 determines whether the use of the default value is permitted to the relevant placeholder. In step S803, the image combining unit 112 reads the data for managing permission of use of the default value by placeholder in FIG. 7F and obtains information about whether the use of the default value is permitted to the placeholder 4 (704). In FIG. 7F, the target PH 751 in the row 754 includes a value "PH4", and the use of default value 752 is "not permitted". Therefore, a determination result in step S803 will be "NO", and the processing proceeds to step S807. Next, in step S807, since there is a placeholder which is not permitted to use the default value in the event of error occurrence, the processing is abnormally ended, and the processing is terminated without generating a combined image.

According to the above-described processing, when a variable object cannot be obtained (the identifier analysis information is abnormal, or a variable object does not exist), the present exemplary embodiment can control permission and non-permission of use of a default value. Therefore, the present exemplary embodiment can provide variable printing capable of printing appropriate data while reducing a frequency of errors.

Next, a third exemplary embodiment is described. A configuration and processing flows according to the present exemplary embodiment conform to those of the second exemplary embodiment. Points different from the second exemplary embodiment are described with reference to the drawings. FIGS. 9A to 9H are specific examples of data pieces according to the present exemplary embodiment. First, FIG. 9A is identifier analysis information according to the present exemplary embodiment. The identifier analysis information includes an id 901, a sex 902, and an annual income rank 903. A row 904, a row 905, and a row 906 respectively include values "E001", "E002", and "E003" in the id. The row 904 includes a value "0" in the sex 902 and a value "–" in the annual income rank 903. The row 905 includes a value "–" in the sex 902 and a value "0" in the annual income rank 903. The row 906 includes a value "1" in the sex 902 and a value "A" in the annual income rank 903.

The value "0" in the identifier analysis information is a special value which orders use of the default data as a variable object. Therefore, in the case of the value "0", a variable object does not need to be obtained from the data source 321. Further, in the case of the value "0", if the variable object obtainment unit 111 tries to obtain a variable object in step S302, the processing always fails because the data source does not include the relevant data value. According to the present exemplary embodiment, in the case of the value "0", the latter processing is executed, and a variable object is always not normally obtained.

FIG. 9B includes data pieces for managing permission and non-permission of use of the default value by placeholder according to the present exemplary embodiment. According to the second exemplary embodiment, permission of use of the default value can be controlled only when an error occurs. However, according to the present exemplary embodiment, permission of use of the default value can also be controlled by specification. FIG. 9B includes a target PH 911, use of the default value by specification 912, and use of the default value in the event of an error 913. A row 914 and a row 915 respectively include a value "PH5" and a value "PH6" in the target PH.

FIG. 9C is a template used in the present exemplary embodiment. The template illustrated in FIG. 9C includes a template form 921, a placeholder 5 (922), namely PH5, as a variable part, a text 923 as a fixed part, and a placeholder 6 (924), namely PH6, as a variable part. The placeholder 5 (922) includes the text "For you" as the default data. The fixed part 923 includes the text "Information about travel". The placeholder 6 (924) includes a text "Travel in season now" as the default data.

FIG. 9D is a combined image generated when a value of the id 901 in the identifier analysis information is "E001" according to the present exemplary embodiment. On a form 931, the text "For you" is written in an area of the PH5 (932), the text "Information about travel" is written in the fixed part 933, and the text "Travel in season now" is written in an area of the PH6 (934).

FIGS. 9E and 9F are data sources according to the present exemplary embodiment. FIG. 9E includes a sex 941 and "PH5" 942. A row 943 and a row 944 respectively include a value "1" and a value "2" in the sex 941. FIG. 9F includes an annual income rank 951 and "PH6" 952. A row 953, a row 954, and a row 955 respectively include a value "A", a value "B", and a value "C" in the annual income rank 951.

FIG. 9G is placeholder information 5 describing information about the placeholder 5 (922). The placeholder information 5 includes a Box value indicating an arrangement position and a range of the placeholder, TEXT as an ObjectType value indicating a type of an object to be arranged, and PH5 as a Column value indicating a column in the data source. In other words, it is defined that a value of "PH5" 942 in FIG. 9F is arranged to the placeholder 5 (922) as a variable object.

FIG. 9H is placeholder information 6 describing information about the placeholder 6 (924). The placeholder information 6 includes a Box value indicating an arrangement position and a range of the placeholder, TEXT as an ObjectType value indicating a type of an object to be arranged, and PH6 as a Column value indicating a column in the data source. In other words, it is defined that a value of "PH6" 952 in FIG. 9F is arranged to the placeholder 6 (924) as a variable object.

Figure 10:
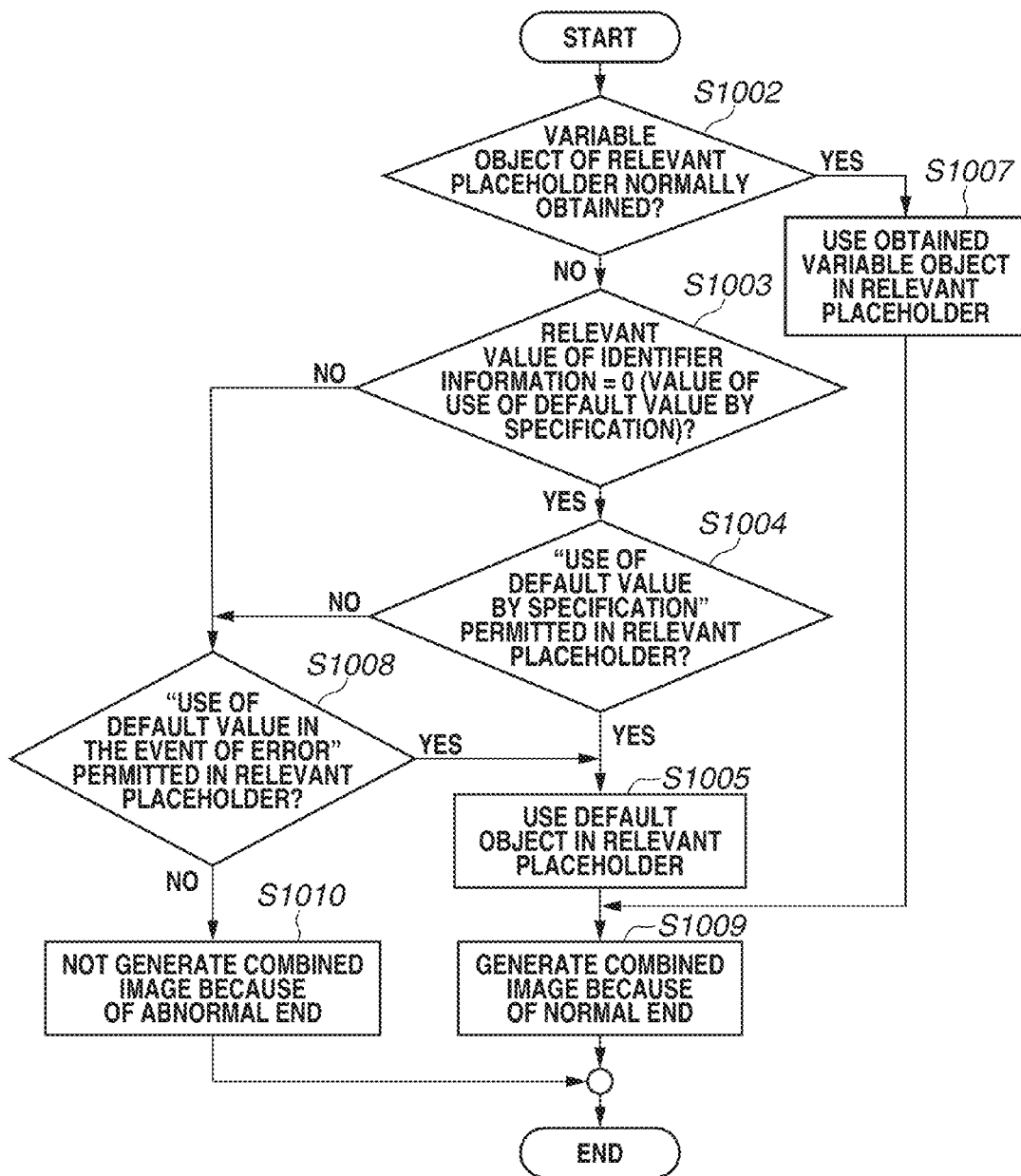
FIG. 10 is a flowchart illustrating image combining processing according to the third exemplary embodiment.

Next, the image combining processing illustrated in FIG. 10 according to the present exemplary embodiment is described. First, in step S1002, it is determined whether a variable object of the relevant placeholder is normally obtained. If the variable object is normally obtained (YES in step S1002), then in step S1007, the image combining unit 112 uses the variable object in the relevant placeholder. Whereas if the variable object is not normally obtained (NO in step S1002), the processing proceeds to step S1003. Then, in step S1003, the image combining unit 112 determines whether use of the default value is permitted to the relevant placeholder. In other words, the image combining unit 112 determines whether a value in the identifier analysis information corresponding to the relevant placeholder is "0" (that indicates use of the default data) or not. If the value is "0", the processing proceeds to step S1004, whereas if the value is not "0", the processing proceeds to step S1008. Next, in step S1004, the image combining unit 112 obtains information about whether the use of the default value is permitted to the relevant placeholder from the data for managing permission of use of the default value by placeholder. If the use of the default value is permitted (YES in step S1004), the processing proceeds to step S1005, whereas if the use of the default value is not permitted (NO in step S1004), the processing proceeds to step S1008.

In step S1008, the image combining unit 112 determines whether the use of the default value in the event of an error is permitted to the relevant placeholder based on the data for managing permission of use of the default value by placeholder. If the use of the default value in the event of an error is permitted (YES in step S1008), the processing proceeds to step S1005. Whereas if the use of the default value in the event of an error is not permitted (NO in step S1008), the processing proceeds to step S1010, and the image combining unit 112 does not generate a combined image by regarding that the processing is abnormally ended because there is a placeholder to which use of the default value is not permitted in the event of an error.

In step S1005, the image combining unit 112 uses a default object since the default value is used in the relevant placeholder. In step S1009, the image combining unit 112 arranges the texts to be used in corresponding placeholders and generates the combined image in FIG. 9D. Accordingly, the image combining processing is completed.

Next, regarding a specific example of the image combining processing in step S305 in FIG. 3, points different between the second exemplary embodiment and the present exemplary embodiment are described with reference to FIG. 10. A case when the processing is executed with respect to the above-described identifier analysis information in FIG. 9A is described in detail. First, the processing is described using the row 904 in the identifier analysis information in FIG. 9A. According to the present exemplary embodiment, the processing is performed on the placeholder 5 (922) and the placeholder 6 (924) in FIG. 9C.

First, the processing is described which is executed when the relevant placeholder is the placeholder 5 (922). In step S1002, the image combining unit 112 determines whether a variable object of the relevant placeholder is normally obtained. The relevant placeholder is the placeholder 5 (922). The row 904 in FIG. 9A includes a value "0" in the sex. When the value of the sex is "0", the processing causes an error, and a variable object is not normally obtained. Thus, a determination result in step S1002 will be "NO", and the processing proceeds to step S1003.

Next, in step S1003, the image combining unit 112 determines whether use of the default value is permitted to the relevant placeholder. In step S1003, the image combining unit 112 determines whether a value of the sex in the row 904 of the identifier analysis information in FIG. 9A is "0" (an order to use the default data). Since the value of the sex in the row 904 is "0", a determination result in step S1003 will be "YES", and the processing proceeds to step S1004.

Next, in step S1004, the image combining unit 112 obtains information about whether the use of the default value is permitted to the placeholder 5 (922) from the data for managing permission of use of the default value by placeholder in FIG. 9B. In FIG. 9B, the use of the default value by specification 912 is "permitted" to "PH5" of the target PH 911. Thus, a determination result in step S1004 will be "YES", and the processing proceeds to step S1005.

In step S1005, since the image combining unit 112 uses the default value in the placeholder 5 (922), the text "For you" on the template is used.

Next, the processing is described which is executed when the relevant placeholder is the placeholder 6 (924). The row 904 in FIG. 9A includes a value "–" in the annual income rank. When the value of the annual income rank is "–", the processing causes an error, and a variable object is not normally obtained. Thus, in step S1002, the image combining unit 112 determines "NO", and the processing proceeds to step S1003. Next, in step S1003, the image combining unit 112 determines whether the use of the default value is permitted to the relevant placeholder. In step S1003, the image combining unit 112 determines whether a value of the annual income rank in the row 905 of the identifier analysis information in FIG. 9A is "0". Since the value of the annual income rank in the row 904 is "–", a determination result in step S1003 will be "NO", and the processing proceeds to step S1008.

Next, in step S1008, the image combining unit 112 obtains information about whether the use of the default value in the event of an error is permitted to the placeholder 6 (924) from the data for managing permission of use of the default value by placeholder in FIG. 9B. In FIG. 9B, the use of the default value in the event of an error 913 is "permitted" to "PH6" of the target PH 911. Thus, a determination result in step S1008 will be "YES", and the processing proceeds to step S1005.

Next, in step S1005, since the image combining unit 112 uses the default data in the placeholder 6 (924), the text "Travel in season now" on the template is used. Then, the processing proceeds to step S1009, and the image combining unit 112 arranges the texts to be used in corresponding placeholders and generates the combined image in FIG. 9D.

Next, the processing is described using the row 905 in the identifier analysis information in FIG. 9A. The processing is successively performed on the placeholder 5 (922) and the placeholder 6 (924) in FIG. 9C. First, in step S1002 in FIG. 10, the image combining unit 112 determines whether a variable object of the relevant placeholder is normally obtained. Here, the processing is described which is executed when the relevant placeholder is the placeholder 5 (922).

The row 905 in FIG. 9A includes a value "–" in the sex. When the value of the sex is "–", the processing causes an error, and a variable object is not normally obtained. Thus, a determination result in step S1002 will be "NO", and the processing proceeds to step S1003. Next, in step S1003, the image combining unit 112 determines whether the use of the default value is permitted to the relevant placeholder. In step S1003, the image combining unit 112 determines whether the value of the sex in the row 904 of the identifier analysis information in FIG. 9A is "0". Since the value of the sex in the row 904 is "–", a determination result in step S1003 will be "NO", and the processing proceeds to step S1008.

Next, in step S1008, the image combining unit 112 obtains information about whether the use of the default value in the event of an error is permitted to the placeholder 5 (922) from the data for managing permission of use of the default value by placeholder in FIG. 9B. In FIG. 9B, the use of the default value in the event of an error 913 is "not permitted" to "PH5" of the target PH 911. Thus, a determination result in step S1008 will be "NO", and the processing proceeds to S1010. Then, in step S1010, the image combining unit 112 does not generate a combined image by regarding that the processing is abnormally ended because there is a placeholder to which use of the default value is not permitted in the event of an error.

Next, the processing is described using the row 906 in the identifier analysis information in FIG. 9A. According to the present exemplary embodiment, the processing is performed on the placeholder 5 (922) and the placeholder 6 (924) in FIG. 9C. In step S1002, the image combining unit 112 determines whether a variable object of the relevant placeholder is normally obtained. First, the processing is described which is executed when the relevant placeholder is the placeholder 5 (922). In FIG. 9G, association of the placeholder 5 (922) with "PH5" 942 in FIG. 9E is defined. The row 906 in FIG. 9A includes a value "1" in the sex. The value "1" matches with the sex in the row 943 in FIG. 9E. Therefore, "For man" which is a value in the row 943 of "PH5" is obtained as a variable object. Thus, in step S1002, the image combining unit 112 determines "YES", and the processing proceeds to step S1007. Next, in step S1007, the image combining unit 112 determines to use the variable object "For man" in the placeholder 5 (922).

Next, the processing is described which is executed when the relevant placeholder is the placeholder 6 (924). In FIG. 9H, association of the placeholder 6 (924) with "PH6" 952 in FIG. 9F is defined. The row 906 in FIG. 9A includes a value "A" in the annual income rank. The value "A" matches with the annual income rank in the row 953 in FIG. 9F. Therefore, "luxurious travel" which is a value in the row 953 of "PH6" is obtained as a variable object. Thus, in step S1002, the image combining unit 112 determines "YES", and the processing proceeds to step S1007. Then, in step S1007, the image combining unit 112 determines to use the variable object "luxurious travel" in the placeholder 6 (924). After the processing is normally ended, the processing proceeds to step S1009, and the image combining unit 112 arranges the texts to be used in corresponding placeholders and generates the combined image in FIG. 9D.

According to the above-described processing, the present exemplary embodiment can explicitly specify use of a default value in addition to control permission and non-permission of use of a default value when a variable object cannot be obtained. Accordingly, the present exemplary embodiment can provide variable printing capable of printing by selecting more appropriate data while reducing a frequency of errors.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-124304, filed Jun. 17, 2014, which is hereby incorporated by reference herein in its entirety.

What is claimed is:

1. A print inspection apparatus which inspects a print product of variable printing, the print inspection apparatus comprising:
a memory; and
at least one processor that controls the print inspection apparatus to function as:
a combining unit configured to obtain an object which is stored in a storage and used in the variable printing and to generate a combined image by combining the obtained object;
an image setting unit configured to, in a case where the combined image is normally generated by the combining unit, set the combined image to both of a print image and a collation image, wherein, in a case where the combined image is not normally generated, the image setting unit sets a first image to the print image and further sets a second image to the collation image prior to printing the print image, and wherein the first image is a blank image, and wherein the second image is a black image used in contrast with the blank image;
a printing unit configured to instruct a printer to perform printing the print image set by the image setting unit thereby generating the print product;
an image obtainment unit configured to obtain image data by reading the generated print product with a scanner; and
a comparison unit configured to compare the image data obtained by the image obtainment unit with the collation image set by the image setting unit to perform inspection of the print product.

2. The print inspection apparatus according to claim 1, wherein, in a case where the object cannot be obtained from the storage, the combining unit determines whether a preliminarily specified object can be used,
wherein, in a case where the preliminarily specified object can be used, the combining unit generates a combined image by combining the preliminarily specified object, and in a case where the preliminarily specified object cannot be used, the combining unit does not generate the combined image.

3. The print inspection apparatus according to claim 1 further comprising, in a case where the image data and the collation image are different from each other as a result of comparison by the comparison unit, an output unit configured to output error information.

4. The print inspection apparatus according to claim 1, wherein the object includes a fixed object and a variable object which can be changed in every printing according to the variable printing.

5. The print inspection apparatus according to claim 1, wherein a process of the image setting unit is performed at a regular time interval from a start of a process of the combining unit.

6. A method of print inspection executed by a print inspection apparatus which inspects a print product of variable printing, the method comprising:

obtaining an object which is stored in a storage and used in the variable printing and generating a combined image by combining the obtained object;

setting, in a case where the combined image is normally generated by the combining, the combined image to both of a print image and a collation image;

setting, in a case where the combined image is not normally generated, a first image to the print image, and further setting a second image to the collation image prior to printing the print image, wherein the first image is a blank image, and wherein the second image is a black image used in contrast with the blank image;

instructing a printer to perform printing the print image set by the image setting thereby generating the print product;

obtaining image data by reading the generated print product with a scanner; and comparing the image data obtained by the reading with the collation image set by the image setting to perform inspection of the print product.

7. A non-transitory computer-readable medium storing a program for controlling a computer to function as:

a combining unit configured to obtain an object which is stored in a storage and used in the variable printing and to generate a combined image by combining the obtained object;

an image setting unit configured to, in a case where the combined image is normally generated by the combining unit, set the combined image to both of a print image and a collation image, wherein, in a case where the combined image is not normally generated, the image setting unit sets a first image to the print image and further sets a second image to the collation image prior to printing the print image, and wherein the first image is a blank image, and wherein the second image is a black image used in contrast with the blank image;

a printing unit configured to instruct a printer to perform printing the print image set by the image setting unit thereby generating the print product;

an image obtainment unit configured to obtain image data by reading the generated print product with a scanner; and a comparison unit configured to compare the image data obtained by the image obtainment unit with the collation image set by the image setting unit to perform inspection of the print product.

* * * * *